May 17, 1927.
E. R. ARMSTRONG
1,629,061
SLED ATTACHMENT FOR AUTOMOBILES
Filed Aug. 8, 1924  2 Sheets-Sheet 2
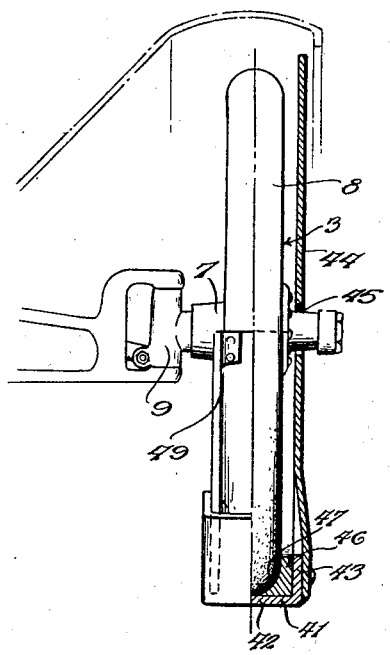
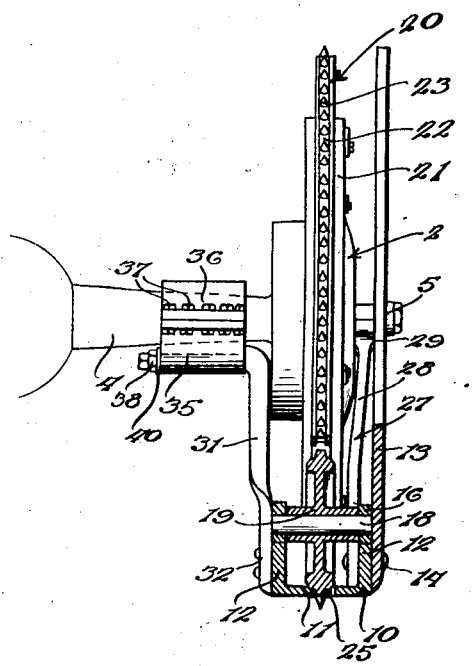
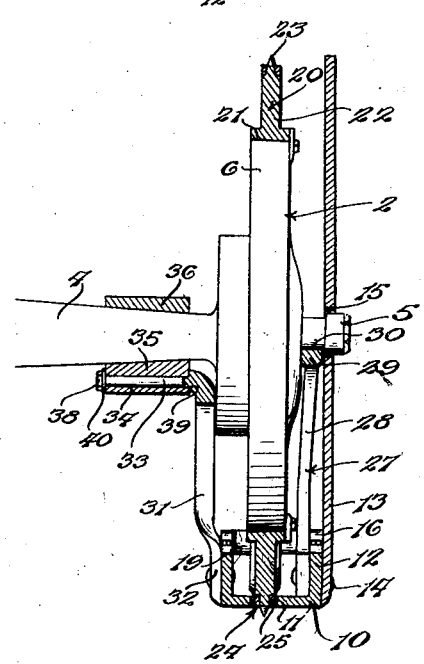
Inventor
E. R. Armstrong
By
Lacey & Lacey, Attorneys Patented May 17, 1927.

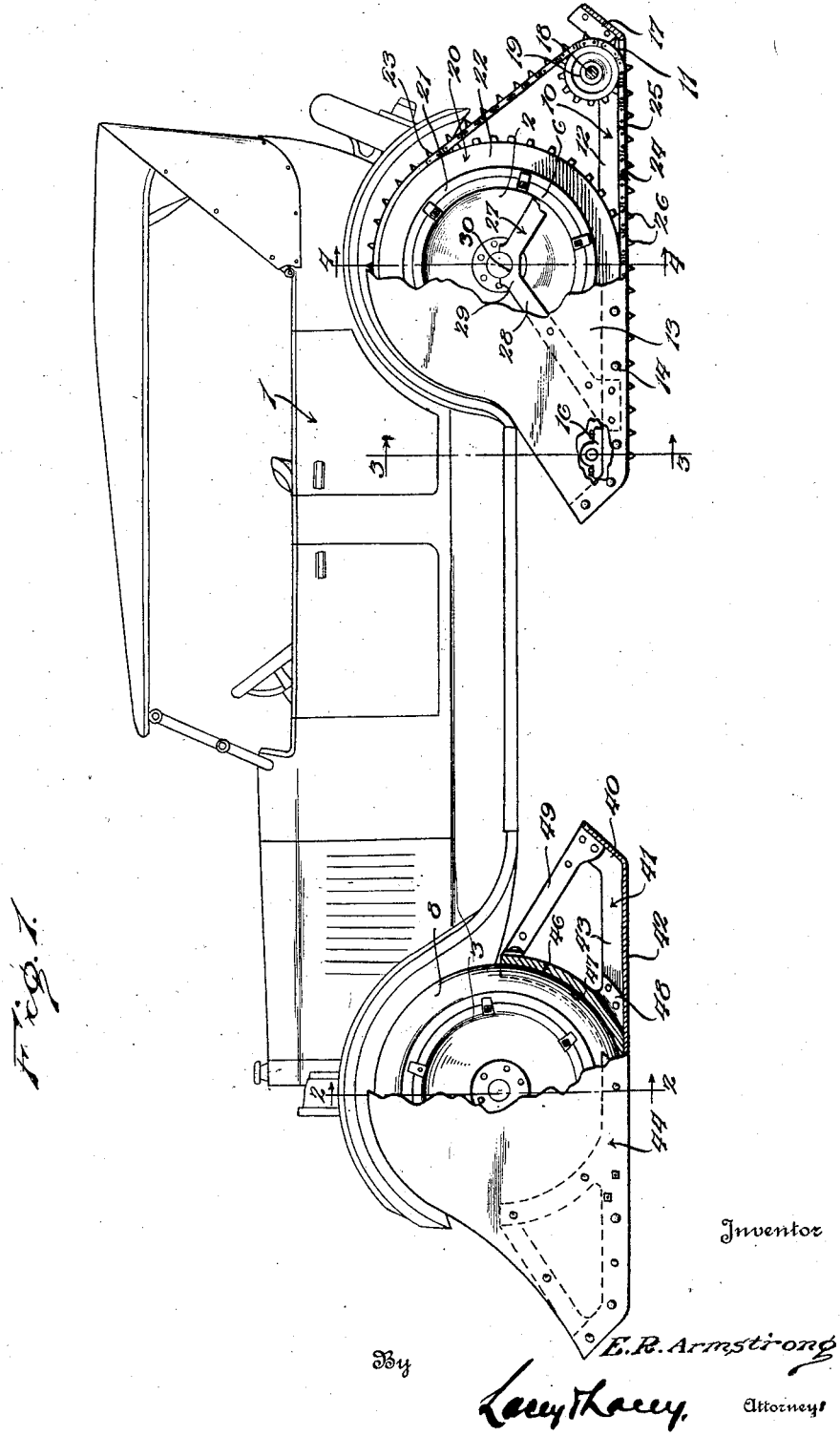

1,629,061

UNITED STATES PATENT OFFICE.

EDWARD R. ARMSTRONG, OF HOLLAND, MICHIGAN.

SLED ATTACHMENT FOR AUTOMOBILES.

Application filed August 8, 1924. Serial No. 730,896.

This invention relates to sled attachments for automobiles and has as its object to provide a sled attachment applicable to the wheels of an automobile to permit of the automobile being driven over snow or ice covered roads with substantially the same facility that it may be driven over roads in normal condition.

Another important object of the invention is to provide traction means applicable to the rear wheels of the automobile and embodying a spur carrying chain driven through rotation of the rear wheels and having a stretch arranged in such a manner as to, in its travel, propel the vehicle over the snow or ice covered roadway.

Another object of the invention is to so construct and mount the runners of the device that they may have sufficient play, with a rocking motion, to adapt them to pass over inequalities in the road surface without causing damage to them or imposing any unnecessary vibrations or shocks upon the running gear of the automobile.

Another object of the invention is to provide runners for the front wheels of the automobile so constructed as not to interfere with proper steering of the vehicle and, at the same time, provide against skidding of the said wheels, the runners for the rear wheels being likewise constructed with this object in view.

In the accompanying drawings:

Figure 1 is a side elevation of an automobile equipped with the attachments embodying the invention, parts being broken away and parts being shown in section to better illustrate the invention.

Figure 2 is a vertical sectional view taken substantially on the line 2—2 of Figure 1, looking in the direction indicated by the arrows.

Figure 3 is a similar view taken substantially on the line 3—3 of Figure 1, looking in the direction indicated by the arrows.

Figure 4 is a similar view taken substantially on the line 4—4 of Figure 1, looking in the direction indicated by the arrows.

The attachments embodying the present invention are applicable to practically any standard automobile although minor changes in construction and reproportioning of the parts may be found necessary in adapting the invention to different makes of cars. However, in any event, the principles will remain the same as defined by the appended claims.

In the drawings, the numeral 1 indicates in general an automobile, the rear and front wheels being indicated respectively by the numerals 2 and 3, and the rear axle housing by the numeral 4. The hub of each rear wheel is indicated by the numeral 5, and the felly of the wheel is indicated by the numeral 6. The hub of each front wheel is indicated by the numeral 7, and, in employing the attachments embodying the invention, the tire 8 of each front wheel is left in place upon the wheel whereas the tire of each rear wheel is removed for a purpose to be presently explained. Likewise, no change is made in the steering mechanism of the automobile and the spindles for the front wheels are supported, as is usual, by the usual steering knuckles indicated by the numeral 9. Therefore, all of these parts remain as usual and no alteration therein is required.

The attachment for the rear wheels of the automobile comprises a runner which is indicated in general by the numeral 10 and which is in the nature of a longitudinal channel iron member formed in its bottom with a longitudinally extending slot indicated by the numeral 11, the side walls of the said member being indicated by the numeral 12 and a protective or face plate 13 being riveted or otherwise secured, as indicated by the numeral 14, to the outer one of the side walls 12 and upstanding in a plane beside the same and formed with an opening 15 to accommodate the hub cap 5 of the respective rear wheels. The lower portion of the plate 13 extends along the outer side of the runner 10 and the upper portion of the said plate is of approximately semi-circular form and of a diameter to substantially conceal the rear wheel 2 of the automobile.

Mounted for rotation in suitable bearings 16 adjacent the ends of the runner 10, which ends are preferably upturned at an obtuse angle as indicated by the numeral 17, are shafts 18 upon which are mounted sprocket gears indicated by the numeral 19. The numeral 20 indicates in general a sprocket gear of relatively large dimensions which gear is of annular form and is fitted onto the felly 6 of each rear wheel 2 after removal of the tire and rim ordinarily mounted upon such wheel. The said gear comprises an annular body 21 having a flange 22 extending circumferentially thereof and outstanding therefrom in a radial direction and provided with a number of sprocket teeth indicated by the numeral 23. A sprocket chain 24 is trained about the upper side of the gear 20 and is extended about the sprocket gears 19 and has a lower stretch which is indicated specifically by the numeral 25 and which extends between the said gears 19 and along the under side of the sprocket gear 20 upon the respective rear wheel 2 and in mesh with the teeth 23 thereof, it being understood that the portion of the chain which is passed over the said gear 20 is likewise in mesh with the said teeth, as clearly shown in Figure 4 of the drawings. The stretch 25 of the sprocket chain travels in the slot 11 in the bottom of the runner 10, and the links of the chain are provided with a number of traction spurs indicated by the numeral 26.

The numeral 27 indicates in general a saddle member comprising downwardly diverging arms 28 and a saddle head 29, which arms at their lower ends are riveted, bolted, or otherwise secured or formed integral with the outer side wall 12 of the runner 10, the saddle head 29 having a seat 30 formed in its upper side to accommodate the hub of the respective rear wheel.

The runner 10 at its inner side is braced with relation to the running gear of the rear axle through the medium of a bracket arm 31 secured at its lower end as at 32, to the inner side wall 12 of the runner 10 and is provided at its upper end with a reduced right angularly extending stem portion 33 which is fitted for limited rotative movement in a bore 34 formed in the under member 35 of a two-part clamp sleeve 36, the parts of which sleeve are secured together about the axle housing 4 by means of bolts 37. A nut 38 is fitted onto the end of the stem 33 and at the juncture of the stem with the bracket arm 31, there is provided a shoulder 39 which engages the outer end of the said under member 35 of the clamp sleeve 36, the nut 38 or a washer 40 upon the end of the stem engaging the other end of the said member 35.

At this point it will be evident that when the engine is running and the wheels 2 are clutched so as to be driven therefrom, the chain 24 will be caused to travel with its lower stretch 25 running in a rearward direction and with the spurs 25 engaging the surface of the snow or ice and thereby resulting in the machine being propelled in a forward direction. By supporting the hub of the rear wheel in the saddle head 29 of the respective saddle member 28 and by mounting the stem portion 33 of the respective bracket arm 31 in the manner above outlined, a slight rocking movement of the respective runner is permitted so as to enable the same to pass smoothly over inequalities in the road surface. It will also be evident that by reason of the fact that the chain 24 is passed over the sprocket gears 19 which are relatively widely spaced, a considerable stretch of the chain is adapted to have tractive engagement with the road surface or, more particularly, the snow or ice covering the same.

Referring now to the runners for the front wheels of the automobile, each runner is indicated in general by the numeral 41 and is of channel iron construction and similar to the runners 10, including a bottom 42 and upstanding side walls 43. However, the bottom of each runner 41 is left imperforate or, in other words, is not provided with a slot the equivalent of the slot 11. A side plate 44 is secured by rivets or otherwise to the outer side wall of the runner 41 and extends upwardly in a plane beside the said wall and is provided at its central portion with an opening 45 to accommodate the hub cap of the respective front wheel 8 with which the runner is associated, this plate having the same general contour as the plate 13 heretofore described.

Arranged within the channel of the runner 41 is a seating member which is indicated in general by the numeral 46 and which is substantially of semi-circular form, the same being transversely concave in its upper side, as indicated by the numeral 47 and as best shown in Figures 1 and 2 of the drawings, so as to accommodate the tread portion of the tire 8 upon the respective front wheel 3. The said seating member 46 is provided with attaching portions 48 riveted or otherwise secured to the side walls 43 of the runner 41, and the said seating member is furthermore braced by a diagonal brace arm 49 secured in any suitable manner to the upturned ends 40 of the runner 41 and at their upper ends secured in any suitable manner to the upper ends of the seating member 46, as clearly shown in Figures 1 and 2. In this manner, the front wheels of the automobile are supported by the front runners and do not come in contact with the surface over which the automobile is to be propelled. However, they are supported in such a manner as to permit steering of the automobile by the operation of the usual steering mechanism so that the car may be guided in its course.

Having thus described the invention, what I claim is:

A sled attachment for the rear wheels of automobiles comprising a runner open at its bottom and having upstanding inner and outer side flanges, a support secured to the inner one of said side flanges and extending upwardly therefrom and having its upper portion provided with a laterally extending stem, a clamp adapted to be removably secured about the axle housing for the rear wheels including separable sections, one section having a bore receiving the said stem, a side plate secured to the outer side flange of the runner and having an opening to accommodate the outer end of the hub of the wheel, a sprocket gear for attachment to the rear wheel, sprocket gears rotatably carried by said runner, a sprocket chain trained about said gears and having a lower stretch extending between the last-mentioned gears, and traction elements carried by the chain and extending through the open bottom of the runner.

In testimony whereof I affix my signature.

EDWARD R. ARMSTRONG. [L. S.]